(12) United States Patent
Zheng et al.

(10) Patent No.: US 9,222,664 B2
(45) Date of Patent: Dec. 29, 2015

(54) BACKLIGHT UNIT AND DISPLAY DEVICE

(71) Applicants: BOE Technology Group Co., Ltd., Beijing (CN); Beijing BOE Chatani Electronics Co., Ltd., Beijing (CN)

(72) Inventors: Weixin Zheng, Beijing (CN); Dongsheng Yang, Beijing (CN); Zhonglian Qiao, Beijing (CN)

(73) Assignees: BOE TECHNOLOGY GROUP CO., LTD., Beijing (CN); BEIJING BOE CHATANI ELECTRONICS CO., LTD., Beijing (CN)

( * ) Notice: Subject to any disclaimer, the term of this patent is extended or adjusted under 35 U.S.C. 154(b) by 76 days.

(21) Appl. No.: 13/940,566

(22) Filed: Jul. 12, 2013

(65) Prior Publication Data
US 2014/0029242 A1 Jan. 30, 2014

(30) Foreign Application Priority Data

Jul. 24, 2012 (CN) ...................... 2012 2 0361574 U

(51) Int. Cl.
*F21V 7/00* (2006.01)
*F21V 33/00* (2006.01)
*F21V 13/08* (2006.01)
*G02F 1/1335* (2006.01)

(52) U.S. Cl.
CPC ............ *F21V 33/0052* (2013.01); *F21V 13/08* (2013.01); *G02F 1/133605* (2013.01); *G02F 1/133608* (2013.01); *G02F 1/133603* (2013.01)

(58) Field of Classification Search
CPC ............ F21V 13/08; G02F 1/133603; G02F 1/133605; G02F 1/133608
USPC ............ 362/97.1, 97.3, 97.4, 237, 240, 241, 362/242, 243, 246, 297, 346
See application file for complete search history.

(56) References Cited

U.S. PATENT DOCUMENTS

| 8,059,230 | B2 * | 11/2011 | Yeh ............................... 362/97.1 |
| 2005/0225960 | A1 * | 10/2005 | Tsai ............................. 362/235 |
| 2006/0181873 | A1 * | 8/2006 | Uke .............................. 362/297 |
| 2009/0284969 | A1 * | 11/2009 | Chang ........................... 362/241 |
| 2010/0296266 | A1 | 11/2010 | Dussault et al. |
| 2012/0206660 | A1 | 8/2012 | Kasai |

FOREIGN PATENT DOCUMENTS

| JP | 2010108642 A | 5/2010 |
| KR | 20100068436 A | 6/2010 |
| WO | 2007043211 A1 | 4/2007 |
| WO | 2011067987 A1 | 6/2011 |

OTHER PUBLICATIONS

Office Action issued by the Korean Patent Office for Korean Patent Application No. 10-2013-0084273, 5pgs.

(Continued)

*Primary Examiner* — Y M Lee

(57) ABSTRACT

Embodiments of the invention provide a backlight unit and a display device. The backlight unit comprises at least one light emitting component and at least one reflection support component, wherein the light emitting component comprises a plurality of element surfaces disposed obliquely and a plurality of luminophors disposed on the element surfaces, the reflection support component comprises a plurality of reflective surfaces disposed obliquely.

13 Claims, 3 Drawing Sheets

(56) References Cited

OTHER PUBLICATIONS

English translation of Office Action issued by the Korean Patent Office for Korean Patent Application No. 10-2013-0084273, 3pgs.
Examination Opinion (in Korean language) issued by the Korean Intellectual Patent Office ("KIPO") on Dec. 19, 2014 for International Application No. 10-2013-0084273KR, 4 pages.
English translation of Examination Opinion issued by KIPO on Dec. 19, 2014 for International Application No. 10-2013-0084273KR, 3 pages.
Examination Opinion (in Korean language) issued by the Korean Intellectual Patent Office ("KIPO") for corresponding Korean Application No. 10-2013-0084273, dated May 27, 2015, 3 pages.
English translation of Examination Opinion issued by the Korean Intellectual Patent Office ("KIPO") for corresponding Korean Application No. 10-2013-0084273, dated May 27, 2015, 2 pages.
Office Action Communication issued by the European Patent Office for corresponding European application No. 13174320.5, dated Jun. 8, 2015; 4 pages.
Examination Opinion (in Korean language) issued by the Korean Intellectual Patent Office ("KIPO") for corresponding Korean Application No. 10-2013-0084273, dated Jul. 28, 2015; 3 pages.
English translation of Examination Opinion issued by the Korean Intellectual Patent Office ("KIPO") for corresponding Korean Application No. 10-2013-0084273, dated Jul. 28, 2015; 2 pages.

* cited by examiner

BACKLIGHT UNIT AND DISPLAY DEVICE

FIELD OF THE ART

Embodiments of the invention relate to a display technology, more specifically, to a backlight unit and a display device.

BACKGROUND

As liquid crystal molecules do not produce light themselves, an external light source is needed in conventional LCDs to display pictures. Backlight sources are categorized into edge-lit type backlight and direct-lit type backlight, based on the relative disposition of the backlight sources. In an edge-lit type backlight configuration, the light source is disposed at a side of the light guide plate (LGP) and light from the lamp bar is directly emitted into the LGP. The LGP is mainly for transforming parallel light incident from the edge into a surface light. In a direct-lit type backlight configuration, the light source is arranged below the liquid crystal panel and the light from the light source travels through a certain distance spatially and is diffused and mixed by the diffuser plate to exit as a surface light source.

Currently, the direct-lit type backlight plays an important role in the LCDs. In the direct-lit type backlight unit, a light-emission surface of a LED is faced with the diffuser plate directly, which can easily produce a light spot with different brightness on the surface of the backlight. To improve the uniformity of the surface light source, a distance between the light source and the film plate is increased to diffuse the light sufficiently (that is, to increase the light mixing height), which will leads to relatively thick backlight unit. To overcome disadvantages of the direct-lit type backlight unit, some conventional technology adds a secondary optical lens in the backlight unit such that the light is diffused through the lens. However, such a design requires a secondary optical system and has too many optical interfaces, thereby limiting the efficiency and the volume of the LED module.

Moreover, picture quality of a LCD panel is directly related to the flatness of optical films in the backlight unit. In the direct-lit type backlight unit, a separate support frame is arranged between the backplate and the diffuser plate to achieve a flat film. However, such a support frame may negatively affect the optical performance of the backlight unit as well.

SUMMARY

Embodiments of the invention provide a backlight unit and a display device.

In one aspect, the invention provides a backlight unit, the backlight unit comprises at least one light emitting component and at least one reflection support component, wherein the light emitting component comprises a plurality of element surfaces disposed obliquely and a plurality of luminophors disposed on the element surfaces, the reflection support component comprises a plurality of reflective surfaces disposed obliquely.

As an example, the element surfaces of the light emitting component form a pyramid structure, and the reflective surfaces of the reflection support component also form a pyramid structure.

As an example, each of the reflective surfaces of the reflection support component is in correspondence with an element surface of the light emitting component.

As an example, a luminophor is disposed on each of the element surfaces of the light emitting component.

As an example, the backlight unit further comprises a backplate and a bottom reflector, wherein the backplate supports the whole backlight unit, the bottom reflector covers a part of the backplate, the light emitting component is disposed on another part of the backplate, and the reflection support component is disposed on the bottom reflector.

As an example, a bracket is further provided on the backplate, the bracket is for supporting the reflection support component.

As an example, a height of the light emitting component is 2 to 5 mm, a height of the reflection support component is 5 to 20 mm.

As an example, an oblique angle of the element surfaces of the light emitting component is 15°-60°, an oblique angle of the reflective surfaces of the reflection support component is 15°-45°.

As an example, the backlight unit comprises a plurality of the light emitting components and a plurality of the reflection support components, wherein the plurality of light emitting components and the plurality of reflection support components are alternatively distributed with equal interval, and the reflection support components surrounding each of the light emitting components are central symmetrically distributed by taking the light emitting component as a center.

As an example, at least a part of light from the luminophors is transmitted to the reflective surfaces of the reflection support component.

As an example, the backlight unit further comprises a diffuser plate, a top portion of the reflection support component is in contact with the diffuser plate to support the diffuser plate, and the light transmitted to the reflective surfaces of the reflection support component is emitted on the diffuser plate after reflection.

In another aspect, the invention provides a display device, the display device comprises any of the backlight unit described above.

Figure 1:
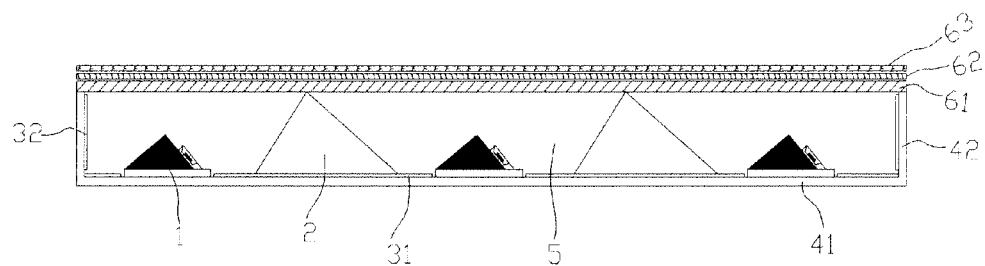
FIG. 1 schematically illustrates a configuration of a backlight unit in accordance with an embodiment of the invention.

DESCRIPTION OF REFERENCE NUMERALS 1. light emitting component; 11. LED light; 12. circuit board; 13. support member; 14. seal glue; 15. LED chip; 16.

seal holder; 2. reflection support component; 21-23. reflective surface; 24. bracket 31. bottom reflector; 41. backplate; 42. sideplate; 5. cavity; 61. diffuser plate; 62. first optical film; 63. second optical film.

DETAILED DESCRIPTION

In order to make objects, technical details and advantages of the embodiments of the invention apparent, the technical solutions of the embodiment will be described in a clearly and fully understandable way in connection with the drawings related to the embodiments of the invention. It is obvious that the described embodiments are just a part but not all of the embodiments of the invention. Based on the described embodiments herein, those skilled in the art can obtain other embodiment(s), without any inventive work, which should be within the scope of the invention.

Provided according to an embodiment of the invention is a backlight unit comprising a light emitting component and a reflection support component, wherein the light emitting component comprises element surfaces disposed obliquely, luminophors are disposed on the element surfaces of the light emitting component, the reflection support component comprises reflective surfaces disposed obliquely. With the arrangement of the invention, light from the luminophors is reflected by each of the reflective surfaces of the reflection support component and forms a uniform light in the space, which increases the overall optical efficiency of the light source and effectively reduces the mixing height of the direct-lit type backlight unit and facilitates the realization of ultra-thin direct-lit type LCD device.

In an embodiment of the invention, a LED light is disposed on each of the inclined element surfaces of a pyramid structure of the light emitting component and each LED light emits light impinging obliquely into a cavity of the backlight unit. The reflection support component also forms a pyramid structure, where each inclined surface is a reflective surface made of highly reflective material. Each reflective surface corresponds to an element surface of the light emitting component (substantially corresponding to the LED light on the element surface) and can effectively reflect light emitted by the LED light in the inclined direction. The reflection support component may be formed individually in parts and then assembled. Alternatively, the reflection support components may be formed by folding the bottom reflector. The reflection support components can be used not only for reflecting the light from the LED lights but also as a support component for supporting components in the upper part of the backlight unit cavity.

In the following, embodiments of the invention will be described in detail with reference to the drawings.

Embodiment 1

In the first embodiment of the invention, a cross section of the backlight unit is illustrated in FIG. 1. The backlight unit comprises a light emitting component 1, a reflection support component 2, a backplate 41, and a plurality of side plates 42. The backplate 41 and the plurality of side plates 42 form a box frame. The light emitting component 1 and the reflection support component 2 are disposed in the box frame. Sequentially disposed above the box frame are a diffuser plate 61, a first optical film 62 and a second optical film 63. The backlight unit further comprises a bottom reflector 31, which covers a part of the backplate 41. The light emitting component 1 is disposed on another part of the back plate 41, that is, the light emitting component 1 is disposed on the part of the back plate having no bottom reflector 31 disposed thereon. The reflection support component 2 is disposed on the bottom reflector 31. Meanwhile, a top portion of the reflection support component 2 is in contact with the diffuser plate 61 to support the diffuser plate 61 and the first and second optical films 62 and 63 disposed on the diffuser plate. The side reflector layer 32 is attached to the side plate 42.

Please note that "a part of" the backplate indicates where the bottom reflector is disposed, "another part of" the back plate is where no bottom reflector is disposed. However, the addition of the two parts does not exactly cover the whole backplate surface. In fact, the disposition of the afore-mentioned bottom reflector, the light emitting component and the backplate is just a preferred embodiment. Actually, the bottom reflector may cover the whole backplate and the light emitting component may be disposed on the bottom reflector.

Figure 2:
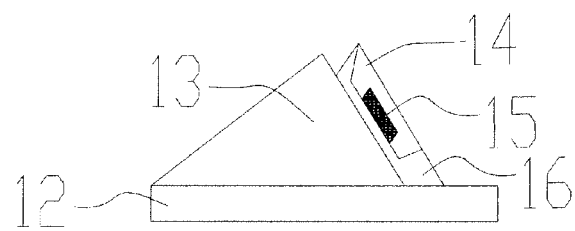
FIG. 2 schematically illustrates a cross section of a light emitting component in accordance with an embodiment of the invention.
Figure 3:
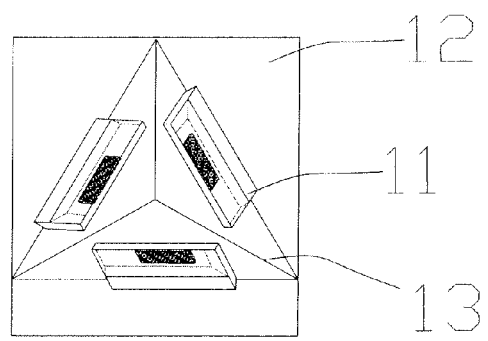
FIG. 3 schematically illustrates a top view of a light emitting component in accordance with an embodiment of the invention.

With further reference to FIGS. 2 and the 3, in which FIG. 2 is a cross section of the light emitting component 1 of the invention and FIG. 3 is a top view of the light emitting component 1. For simplicity reasons, the luminophor in the light emitting component of the invention is a LED, which is not limitative. The light emitting component comprises a circuit board 12, a support member 13 and a LED light 11, where the bottom surface of the circuit board is in contact with the backplate and the upper surface of which is in contact with the support member 13. The support member 13 is a pyramid that consists of a plurality of slant element surface. The LED light 11 comprises a LED chip 15, a seal holder 16 and a seal glue 14. Each LED light 11 is fixed to a slant element surface of the support member 13 using a seal holder. The bottom surface of the seal holder 16 is connected with the circuit board 12 such that a power is provided for the LED chip 15. The LED chip 15 is encapsulated in the seal glue 14. The whole light emitting component forms a pyramid structure, the bottom surface of which is in contact with the circuit board 12 and the rest of the slant surfaces function as element surfaces for disposing the LED light 11. An angle between each element surface and the circuit board is a light-emission incline of the LED light 11. A triangular pyramid (comprising three element surfaces whereupon LED lights may be fixed, except for the bottom surface) is taken as an example for description in FIG. 3. However, it can be understood by those skilled in the art that the triangular pyramid is not the only embodiment of the light emitting component pyramid, and a pyramid with more element surfaces may be used in the embodiment as well, such as a rectangular pyramid or a pentagonal pyramid.

Figure 4:
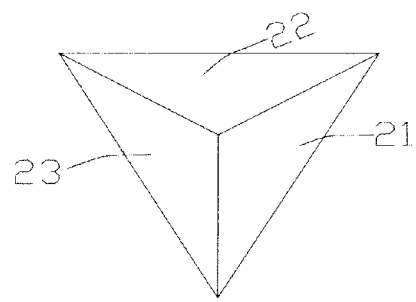
FIG. 4 schematically illustrates a top view of a reflection support component in accordance with an embodiment of the invention.
Figure 5:
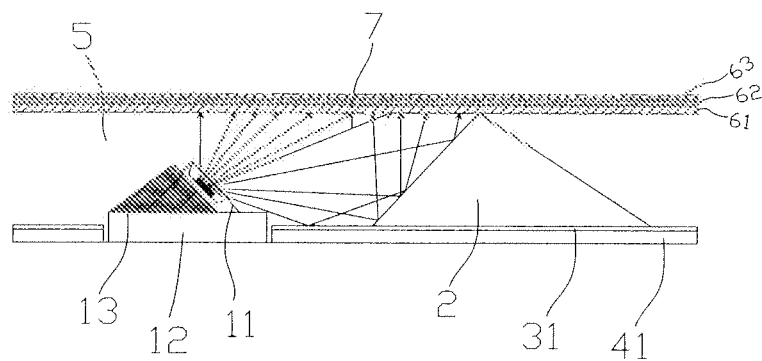
FIG. 5 schematically illustrates optical paths in accordance with an embodiment of the invention.

FIG. 4 is a top view of the reflection support component. In correspondence with the light emitting component of the triangular pyramid in FIG. 3, the reflection support component of FIG. 4 also comprises three slant reflection surfaces 21 to 23, each of the reflection surfaces corresponds to a LED light in one of the element surfaces of the light emitting component. The optical paths of the lights in the cavity are illustrated in FIG. 5. A part of the light 7 emitted by the LED light 11 is directly transmitted to the diffuser plate 61 and another part of the light is incident on the bottom reflector 31 or a reflection surface of the reflection support component 2 and then transmitted to the diffuser plat 61 after being reflected by the bottom reflector 31 and/or the reflection surface. In such a way, the unreflected light and reflected light are sufficiently mixed in the cavity 5, making the light from the LED light 11 arrived on the diffuser plate 61 more uniformly with a shorter mixing height.

In the first embodiment, the reflection support component made of a highly reflective material is a pyramid structure in correspondence with the light emitting component. The reflection support component not only reflects light but also support the diffuser plate in the backlight unit, thereby making the direct-lit type backlight unit have a flat and stable film structure.

In an embodiment of the invention, a width of the LED light is for example 3 mm. A size of the light emitting component is required to be big enough for receiving the LED light, a height of light emitting component therefore can be made between 2 to 5 mm. A height of the reflection support component is determined by the angle of the light emitting component (that is the light-emission incline of the LED light). In order to effectively reflect the light to the diffuser plate, the larger the light-emission incline is, the smaller the angle between the reflection surface and the bottom surface of the reflection support component is, therefore the smaller the height of the reflection support component is. Since the height of the light emitting component is controlled to be between for example 2 to 5 mm, the height of the reflection support component for achieving the aforementioned optical paths is for example about 5 to 20 mm. In comparison with the height of 15 to 40 mm of the conventional direct-lit backlight source, the light mixing height of the reflection support component is significantly reduced, which in turn leads to decrease in the height of the backlight unit, thereby reducing the required material, especially the metal material for the backplate. As a result, a lightweight and thin LCD is realized.

Furthermore, in an embodiment of the invention, the angle of the light emitting component is limited by the light emission angle of the LED light which is normally 120°. To ensure the uniformity of the light transmitted upwards to the diffuser plate from the LED and avoid the appearance of regions with too much or too little light, the angle of the light emitting component is usually controlled to be 15° to 60°. Accordingly, the angle between the reflection surface and the bottom surface of the reflection support component is for example 10° to 45°.

In the embodiment of the invention, a LED light is disposed on each of the slant element surfaces of the light emitting component, and each group of light emitting components form a individual object, therefore, ON/OFF control of individual elements and individual LED lights by the circuit can be easily realized, which in turn makes the contrast in the display region easily controllable.

Embodiment 2

Figure 6:
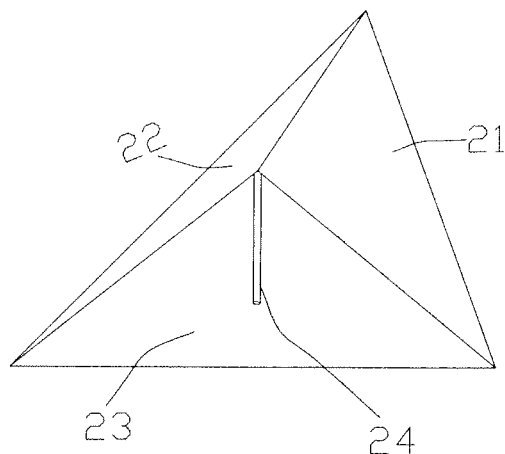
FIG. 6 schematically illustrates a configuration of a reflection support component in accordance with another embodiment of the invention.

The general structure of Embodiment 2 of the invention is the same as Embodiment 1 except for that the reflection support component may be formed by folding the bottom reflector. As illustrated in FIG. 6, for each of the reflection support component, a bracket 24 disposed on the backplate supports the reflection support component and a plurality of reflection surfaces 21 to 23 of the reflection support component is formed by folding the bottom reflector 31 and fixed at a top end of the bracket 24.

Embodiment 3

Figure 7:
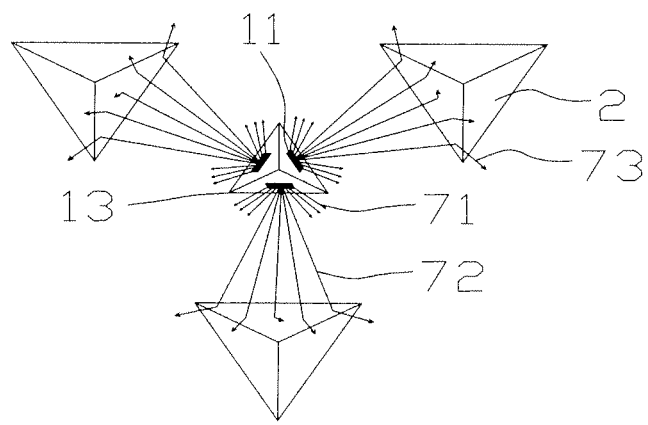
FIG. 7 schematically illustrates effect of optical paths in accordance with yet another embodiment of the invention.

The general structure of Embodiment 3 of the invention is the same as Embodiment 1. Embodiment 3 describes a configuration of having a plurality of light emitting components and a plurality of reflection support components in the backlight unit. FIG. 7 illustrates a top view of optical paths in the cavity of the backlight unit, in which the lights emitted from the LED light 11 disposed on the support member 13 contains light 71 directly emitted to the cavity space, light 72 emitted to the reflection surfaces of the reflection support components 2, and light 73 reflected by the reflection surfaces.

Figure 8:
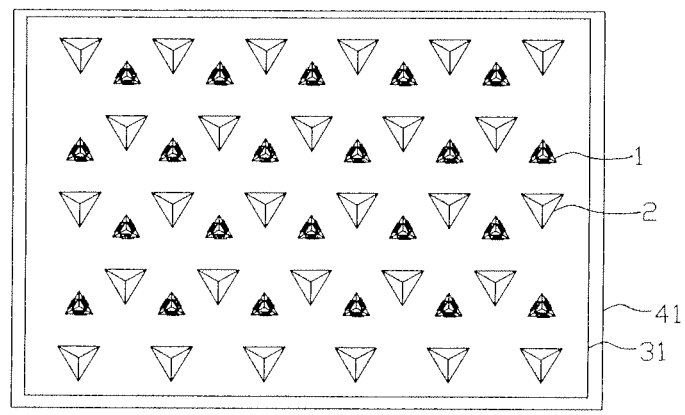
FIG. 8 schematically illustrates a configuration in which backlight unit is arranged in an array in accordance with yet another embodiment of the invention.

As illustrated in FIG. 8, to achieve more uniform optical effect, the light emitting components 1 and reflection support components 2 of the direct-lit type backlight unit are arranged as an array, the bottom reflector 31 is disposed on the backplate 41, the light emitting components 1 and reflection support components 2 are disposed on the bottom reflector 31, the light emitting components 1 and reflection support components 2 are alternatively distributed with an equal interval, light emitting surface of each of the light emitting components 1 has a one-to-one correspondence with the reflection surface of the reflection support components 2, and the reflection support components 2 surrounding each of the light emitting components 1 are central symmetrically distributed by taking the light emitting component as a center, thereby forming an overall uniform structure.

Preferably, an embodiment of the invention further provides a display device, the display device comprises any of the backlight unit as described above. The display device may be a LCD panel, an E-paper, an OLED panel, an LCD television, a LCD monitor, a digital photoframe, a mobile phone, a tablet PC and any other product or component having a display function.

In comparison with the conventional backlight unit where the light emitted from the light source directly incident onto the diffuser plate, the light source in the direct-lit type backlight of the invention is designed as being oblique, such that the light from the light source obliquely emits to the surrounding cavity. As a result, more light incidents to the light emitting surface, and the light incident area of the diffuser plate is increased. A small part of the light emits to the reflective surface of the reflection support component and is used again and mixed with the former kind of light. Such a design not only reduces the design of secondary optical system but also guarantees the efficiency of the light source. The reflection support component combines the optical design and the support structure, which demonstrates a better way of space usage and optical power usage than the conventional single support member.

The invention ensures the efficiency of the light source, fully utilizes the internal space of the backlight unit, improves the overall optical efficiency of the light source, and effectively reduces the light mixing height of the direct-lit type backlight unit, and facilitates the realization of ultra-thin direct-lit type LCD devices.

The invention may further have the following configuration:

(1) A backlight unit, the backlight unit comprises: at least one light emitting component and at least one reflection support component, wherein the light emitting component comprises a plurality of element surfaces disposed obliquely and a plurality of luminophore disposed on the element surfaces, the reflection support component comprises a plurality of reflective surfaces disposed obliquely.

(2) The backlight unit of paragraph (1), wherein the plurality of element surfaces of the light emitting component form a pyramid structure, and the plurality of reflective surfaces of the reflection support component also form a pyramid structure.

(3) The backlight unit of paragraph (1) or (2), wherein each of the reflective surfaces of the reflection support component is in correspondence with an element surface of the light emitting component.

(4) The backlight unit of paragraph (3), wherein a luminophor is disposed on each of the element surfaces of the light emitting component.

(5) The backlight unit of paragraph (4), further comprising a backplate and a bottom reflector, wherein the backplate supports the whole backlight unit, the bottom reflector covers a part of the backplate, the light emitting component is disposed on another part of the backplate, and the reflection support component is disposed on the bottom reflector.

(6) The backlight unit of paragraph (5), wherein a bracket is further provided on the backplate, the bracket is for supporting the reflection support component.

(7) The backlight unit of paragraph (1), wherein a height of the light emitting component is 2 to 5 mm, a height of the reflection support component is 5 to 20 mm.

(8) The backlight unit of paragraph (1), wherein an oblique angle of the element surfaces of the light emitting component is 15°-60°, an oblique angle of the reflective surfaces of the reflection support component is 15°-45°.

(9) The backlight unit of paragraph (1), wherein the backlight unit comprises a plurality of the light emitting components and a plurality of the reflection support components, wherein the plurality of light emitting components and the plurality of reflection support components are alternatively distributed with equal interval, and the reflection support components surrounding each of the light emitting components are central symmetrically distributed by taking the light emitting component as a center.

(10) The backlight unit of paragraph (1), wherein at least a part of light from the luminophors is transmitted to the reflective surfaces of the reflection support component.

(11) The backlight unit of claim 10), further comprising a diffuser plate, a top portion of the reflection support component is in contact with the diffuser plate to support the diffuser plate, and the light transmitted to the reflective surfaces of the reflection support component is emitted on the diffuser plate after reflection.

(12) A display device comprising the backlight unit of any of paragraphs 1 to 11.

What are described above is related to the illustrative embodiments of the disclosure only and not (imitative to the scope of the disclosure; the scopes of the disclosure are defined by the accompanying claims.

What is claimed is:

1. A backlight unit, comprising:
   a light emitting component and reflection support components surrounding the light emitting component,
   wherein the light emitting component comprises a plurality of element surfaces disposed obliquely and a plurality of luminophors disposed on the element surfaces, each of the reflection support components comprises a plurality of reflective surfaces disposed obliquely,
   wherein the light emitting component is provided outside each of the reflection support components, and the reflection support components surrounding the light emitting component are separated from each other by a distance, and
   wherein the backlight unit further comprises a bracket for supporting the reflection support component and the bracket is provided inside the reflection support component.

2. The backlight unit of claim 1, wherein the element surfaces of the light emitting component form a pyramid structure, and the reflective surfaces of the reflection support component also form a pyramid structure.

3. The backlight unit of claim 1, wherein each of the reflective surfaces of the reflection support component is in correspondence with one element surface of the light emitting component.

4. The backlight unit of claim 3, wherein a luminophor is disposed on each of the element surfaces of the light emitting component.

5. The backlight unit of claim 4, further comprising a backplate and a bottom reflector, wherein the backplate supports the whole backlight unit, the bottom reflector covers a part of the backplate, the light emitting component is disposed on another part of the backplate, and the reflection support component is disposed on the bottom reflector.

6. The backlight unit of claim 5, wherein the bracket is provided on the backplate.

7. The backlight unit of claim 1, wherein a height of the light emitting component is 2 to 5 mm, a height of the reflection support component is 5 to 20 mm.

8. The backlight unit of claim 1, wherein an oblique angle of the element surfaces of the light emitting component is 15°-60°, an oblique angle of the reflective surfaces of the reflection support component is 15°-45°.

9. The backlight unit of claim 1, wherein the backlight unit comprises a plurality of the light emitting components and a plurality of the reflection support components, wherein the plurality of light emitting components and the plurality of reflection support components are alternatively distributed with equal interval, and the reflection support components surrounding each of the light emitting components are central symmetrically distributed by taking the light emitting component as a center.

10. The backlight unit of claim 1, wherein at least a part of light from the luminophors is transmitted to the reflective surfaces of the reflection support component.

11. The backlight unit of claim 10, further comprising a diffuser plate, a top portion of the reflection support component is in contact with the diffuser plate to support the diffuser plate, and the light transmitted to the reflective surfaces of the reflection support component is emitted on the diffuser plate after reflection.

12. A display device comprising the backlight unit of claim 1.

13. The backlight unit of claim 2, wherein each of the reflective surfaces of the reflection support component is in correspondence with an element surface of the light emitting component.

* * * * *